(12) United States Patent
Miesak

(10) Patent No.: US 9,329,313 B2
(45) Date of Patent: May 3, 2016

(54) SYSTEM AND METHOD FOR PHOTOGRAPHING CYLINDRICAL OR SPHERICAL OBJECTS WITH REDUCED GLARE

(71) Applicant: LOCKHEED MARTIN CORPORATION, Bethesda, MD (US)

(72) Inventor: Edward Jozef Miesak, Windermere, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 14/022,198

(22) Filed: Sep. 9, 2013

(65) Prior Publication Data

US 2014/0071536 A1    Mar. 13, 2014

Related U.S. Application Data

(60) Provisional application No. 61/697,964, filed on Sep. 7, 2012.

(51) Int. Cl.
| | |
|---|---|
| *G02B 5/26* | (2006.01) |
| *G02B 5/02* | (2006.01) |
| *G02B 5/00* | (2006.01) |
| *G02B 5/20* | (2006.01) |

(52) U.S. Cl.
CPC .. *G02B 5/26* (2013.01); *G02B 5/00* (2013.01); *G02B 5/0294* (2013.01); *G02B 5/20* (2013.01)

(58) Field of Classification Search
CPC ........... G02B 5/20; G02B 5/26; G02B 5/0294
USPC .................. 359/601–605, 608, 609, 613, 614
See application file for complete search history.

(56) References Cited

U.S. PATENT DOCUMENTS

| | | | |
|---|---|---|---|
| 3,529,520 A | 9/1970 | Thiebault | |
| 4,568,157 A | 2/1986 | Kurwa | |
| 4,856,863 A * | 8/1989 | Sampsell | G02B 6/2817 250/227.26 |
| 5,080,688 A * | 1/1992 | Cohen | C09B 67/0038 351/159.3 |
| 5,289,218 A | 2/1994 | Pippin | |
| 5,289,253 A * | 2/1994 | Costello | G06K 9/00046 356/71 |
| 5,432,600 A | 7/1995 | Grollimund et al. | |
| 5,526,436 A * | 6/1996 | Sekiya | G06K 9/00046 356/71 |
| 6,786,610 B2 * | 9/2004 | Faris | 359/613 |
| 7,489,391 B2 | 2/2009 | Engheta et al. | |
| 8,143,563 B2 * | 3/2012 | Broude et al. | 250/203.4 |
| 2004/0012762 A1 * | 1/2004 | Faris | 353/122 |
| 2005/0036153 A1 * | 2/2005 | Joannes | G02B 27/54 356/518 |
| 2008/0122927 A1 | 5/2008 | Konno et al. | |

(Continued)

FOREIGN PATENT DOCUMENTS

WO    WO 2011/024193    3/2011

*Primary Examiner* — Bumsuk Won
*Assistant Examiner* — William R Alexander
(74) *Attorney, Agent, or Firm* — Terry M. Sanks, Esq.; Beusse Wolter Sanks & Maire, PLLC

(57) ABSTRACT

A system including an imaging device with a line of sight to an object, capable of producing a glare, which is to be captured in an image, a light source configured to illuminate a surface of the object, and an optical barrier positioned along the line of sight between the imaging device and the object, said optical barrier being sized and positioned to reduce reflected light off the surface of the object directed along the line of sight from being captured in the image. Methods are also disclosed.

19 Claims, 5 Drawing Sheets

(56) References Cited

U.S. PATENT DOCUMENTS

| | | |
|---|---|---|
| 2009/0168185 A1 | 7/2009 | Augustine |
| 2009/0290781 A1 | 11/2009 | Yannick et al. |
| 2010/0124064 A1 | 5/2010 | Ogawa et al. |
| 2011/0275932 A1 * | 11/2011 | Leblond et al. ............... 600/425 |

* cited by examiner

SYSTEM AND METHOD FOR PHOTOGRAPHING CYLINDRICAL OR SPHERICAL OBJECTS WITH REDUCED GLARE

CROSS-REFERENCE TO RELATED APPLICATIONS

This application claims the benefit of U.S. Provisional Application No. 61/697,964 filed Sep. 7, 2012, and incorporated herein by reference in its entirety.

BACKGROUND

Embodiments relate to an imaging system and, more particularly, to a system and method to capture an image of a spherical object with reduced glare.

Imaging a curved surface, particularly a reflective curved surface, may be challenging due to glare off of the curved surface which may be present in a captured image. This occurs because there is usually a location on the curved surface that reflects an illuminated light directly into a lens of a camera which causes the glare.

Entities wishing to take photographs where issues involving glare are minimized would benefit from a system and method where an image may be captured of a reflective spherical object where glare is not included, or minimized, in the captured image.

SUMMARY

Embodiments relate to a system and method to image a spherical or cylindrical object with reduced glare being included in the captured image. The system comprises an imaging device with a line of sight to an object, capable of producing a glare, which is to be captured in an image. The system also comprises a light source configured to illuminate a surface of the object. The system also comprises an optical barrier positioned along the line of sight between the imaging device and the object, said optical barrier being sized and positioned to reduce reflected light off the surface of the object directed along the line of sight from being captured in the image.

The method comprises imaging a surface of an object capable of producing a glare in an image taken of the object. The method also comprises positioning an optical barrier a line of sight of an imaging device to the object. The method also comprise imaging the surface of the object with the imaging device to produce a captured image with an amount of glare reduced due to a position of the optical barrier.

Another method comprises locating an optical barrier in a line of sight between an imaging device and an object capable of producing a glare in an image of the object. The method also comprises illuminating the object with a light source; The method also comprises acquiring the image of the object where the glare is minimized due to a location of the optical barrier with visibility of the optical barrier in the image reduced.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Figure 1:
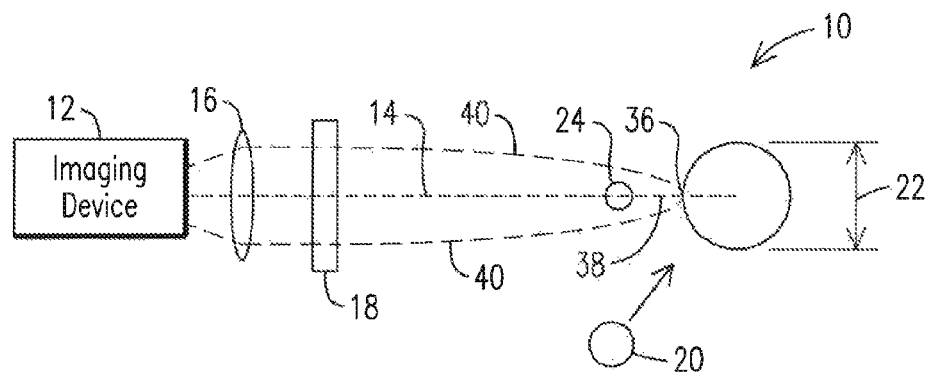
FIG. 1 depicts a schematic top view of an embodiment of a system.

Embodiments are described herein with reference to the attached figures, wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

FIG. 1 illustrates a system 10 to locally reduce glare in an image without adversely affecting a quality of the image. The system 10 includes a camera 12, or imaging device, with a line of sight 14 along which a lens 16, a filter 18, an optical barrier 24 and a curved object 22 are positioned. As used herein, "imaging device" may refer solely to the camera or the combination of the camera and lens. The curved object 22 is not a part of the system 10. Additionally, FIG. 1 illustrates that a light source 20 is positioned off of a line of the sight 14 and is configured to illuminate a curved object 22. This location of the light source 20 is not limiting as it may be positioned on a line of sight 14, such as being a part of a housing holding the camera 12.

Figure 2:
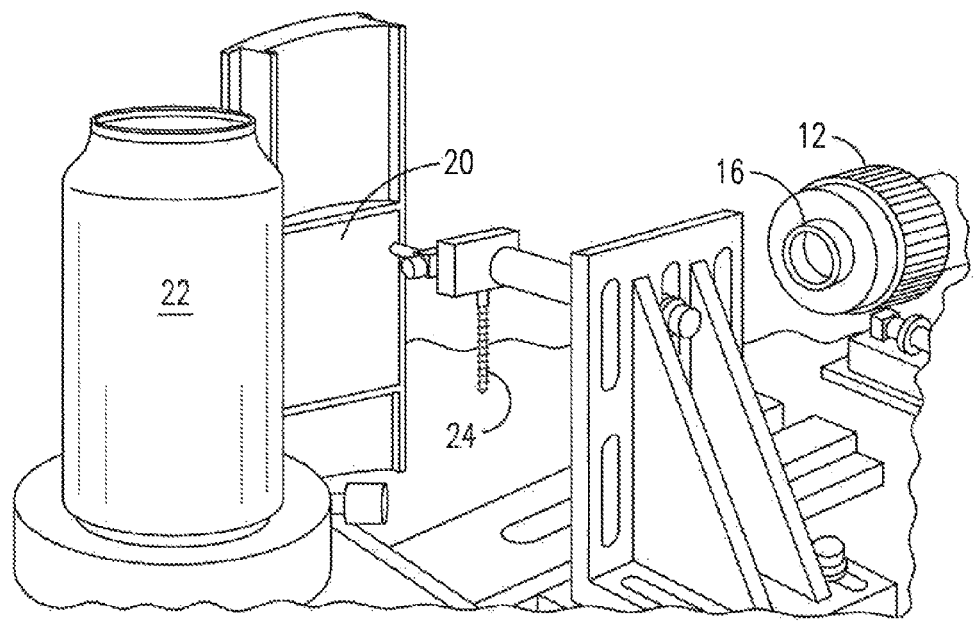
FIG. 2 depicts a side perspective view of an embodiment of a system.

FIG. 2 illustrates a different view of the system 10. A similar embodiment was utilized by the inventor, in a laboratory setting. However, though developed in a laboratory setting, embodiments disclosed herein are not limited to laboratory setting. This illustration is primarily provided to further illustrate placement of the optical barrier in the line of sight.

As a non-limiting example, the lens 16 may be a quartz lens, and the filter 18 may be a 254 nm band pass filter provided to block fluorescence reflected from the object 22 to the camera 12. As a non-limiting example, the optical barrier 24 may be a drill bit with a diameter of about 0.097 inches. As a non-limiting example, the light source 20 may be a high-pressure mercury (Hg) lamp. For illustration purposes, the curved object 22 is illustrated as side of a soda can. Although the illustrated embodiment of the object 22 is a curved object, embodiments disclosed herein are not limited to reducing glare in an image of a curved object, and may include reducing glare in an image of a flat object, for example. Additionally, though "spherical" has been used herein, the object may have any form of a curve including, but not limited to, concave or convex.

Turning back to FIG. 1, a portion of light 38 from the light source 20 that is reflected from the curved object 22 is directed along the line of sight 14 and into the camera 12. This portion of light 38 causes glare in an image of the object 22 in the camera 12, since a portion of the camera sensor receiving this portion of light 38 is saturated. In order to block the portion of light 38 reflected off the surface of the curved object 22 that is directed along the line of sight 14, the optical barrier 24 is positioned along the line of sight 14, between the curved object 22 and the filter 18. While the optical barrier 24 is sized and positioned along the line of sight 14 to selectively block the portion of light 38 that reflects off the surface of the curved object 22 and is directed along the line of sight 14, the optical barrier 24 does not obstruct the remaining reflected light off the curved object 22 which passes through the filter 18, the lens 16 and enters the camera 12. Thus, the optical barrier may comprise a plurality of shapes and sizes, where the shape and size may be dependent on placement of the camera 12 with respect to the object 22. The optical barrier 24 may be sized with respect to the curved surface 22. The optical barrier 24 may have to be adjusted laterally as well its position along the line of sight 14. These adjustments may have to occur after an initial image is taken to correct for any glare realized in the initial image. With an adjustment as disclosed here, the glare should be less than in the initial image.

As further illustrated in FIG. 1, the optical barrier 24 may block the portion of light 38 that reflects off a portion 36 of the curved object 22 that directs the portion of light 38 along the line of sight 14. Additionally, the optical barrier 24 may block a direct line of sight between the camera 12 and the portion 36 of the curved object 22. However, as also illustrated in FIG. 1, the optical barrier 24 does not block a portion of light 40 that reflects off the portion 36 of the curved object 22, passes through the lens 16 and enters the camera 12. Thus, the camera 12 need not have a direct line of sight to the portion 36 of the curved object 22, in order to yield the image 30 which includes the portion 36 of the curved object 22, since the camera 12 receives the portion of light 40 from the portion 36 of the curved object 22.

Figure 3:
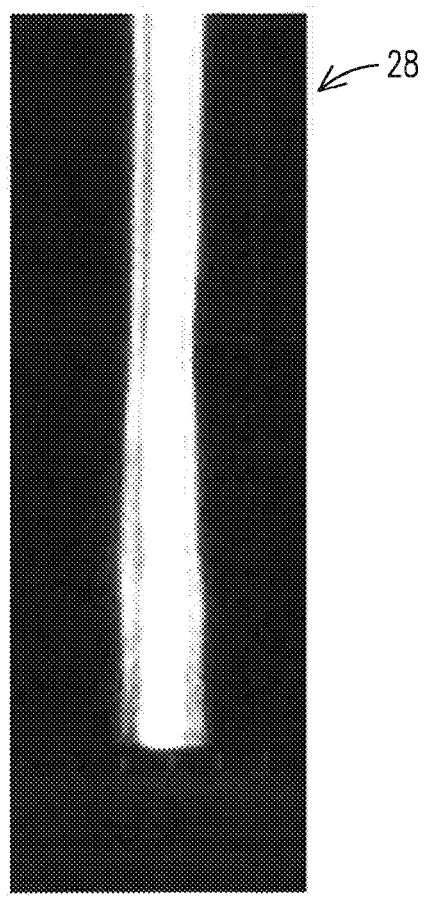
FIG. 3 depicts an image of a cylindrical object without an optical barrier to block glare.

FIG. 3 illustrates an image 28 of the curved object 22 produced by the camera 12 which shows the glare caused by the reflected portion of light 38. As illustrated, glare saturated the image. Although a photographer can selectively reduce the sensitivity of the sensor in the camera 12 to remove the saturation in the image 28 of FIG. 3, the rest of the image 28 of the object 22 will be under exposed. Thus embodiments discussed herein disclose how to locally reduce the an amount of glare in the image 28 of the object 22, without affecting the quality of the rest of the image 28 of the object 22.

Figure 4:
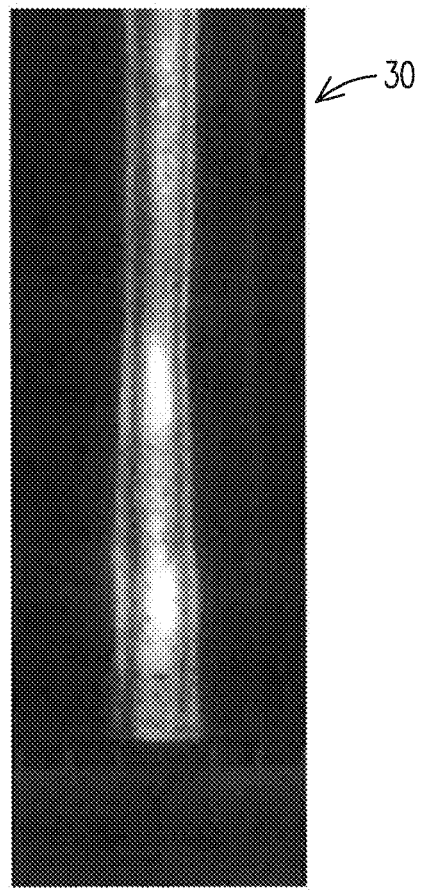
FIG. 4 depicts an image of the cylindrical object with the optical barrier to block glare.

FIG. 4 illustrates an image 30 of the curved object 22 produced by the camera 12, without the portion of light 38 that is present in the image 28 of FIG. 3. As illustrated, a lateral position of the optical barrier 24 in an orthogonal direction to the line of sight 14 was adjusted, until the glare in the image 30 was minimized. After the adjustment of the optical barrier 24, the lens 16 of the system 10 may be refocused, before the image 30 is captured. Portions of the curved object 22 can be seen in the image 30, whereas these same portions of the curved object 22 could not be seen in the image 28, based on the glare. As a non-limiting example, an image of a fingerprint on a portion of the curved object 22 may be viewed in the image 30, whereas this image of the fingerprint may not have been viewable in the image 28.

Figure 5:
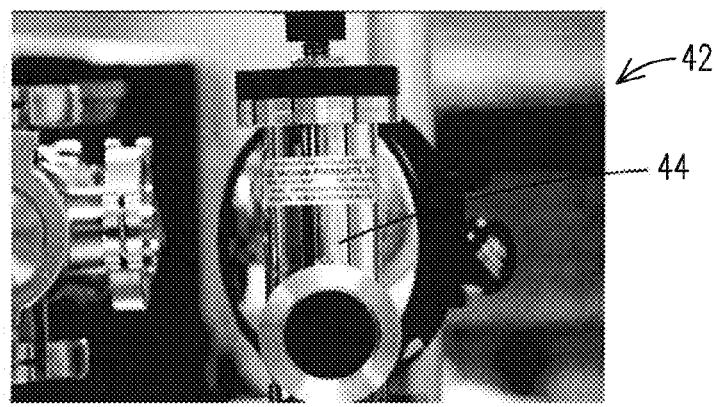
FIG. 5 depicts an unobstructed captured image of an object.
Figure 6:
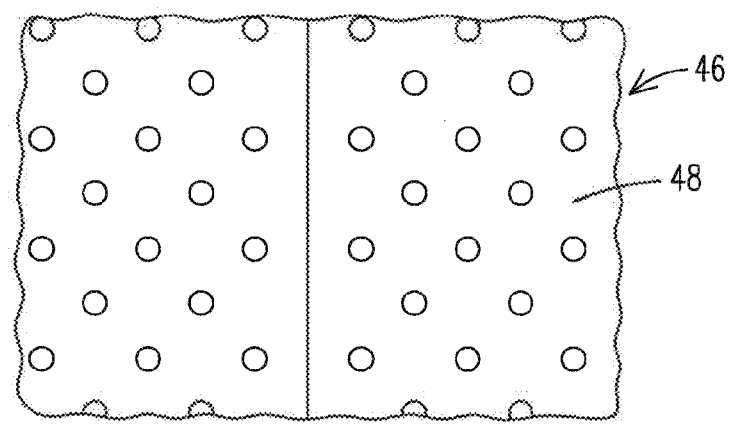
FIG. 6 depicts an embodiment of an optical barrier.
Figure 7:
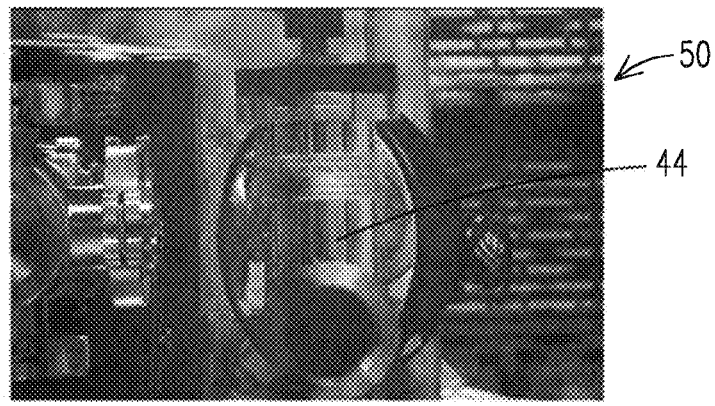
FIG. 7 depicts an obstructed captured image of the object in FIG. 5 with the optical barrier in place.

Though one may assume that a camera needs a direct line of sight to image an object and any object within the line of sight would be captured in a picture taken, this is not always true as illustrated in FIGS. 5-7. FIGS. 5-7 demonstrate utilizing an embodiment disclosed herein, with regard to an initial image 42 of an object 44 which is reflective and curved may result in a final image with reduced glare and without the optical barrier being visible. The image in FIG. 5 was taken without any optical barrier. An optical barrier 46 with a plate 48 design with a grid pattern of holes is illustrated in FIG. 6. This optical barrier was positioned between the object 44 and a camera 12. A final image 50 of the object 44 with the optical barrier 46 positioned between the object 44 and the camera is illustrated in FIG. 7. The image 50 of the object in FIG. 7 includes portions of the object 44 without a direct line of sight to the camera. The glare is minimized and the optical barrier 46 is not invisible, or is invisible in the final image 50.

Figure 8:
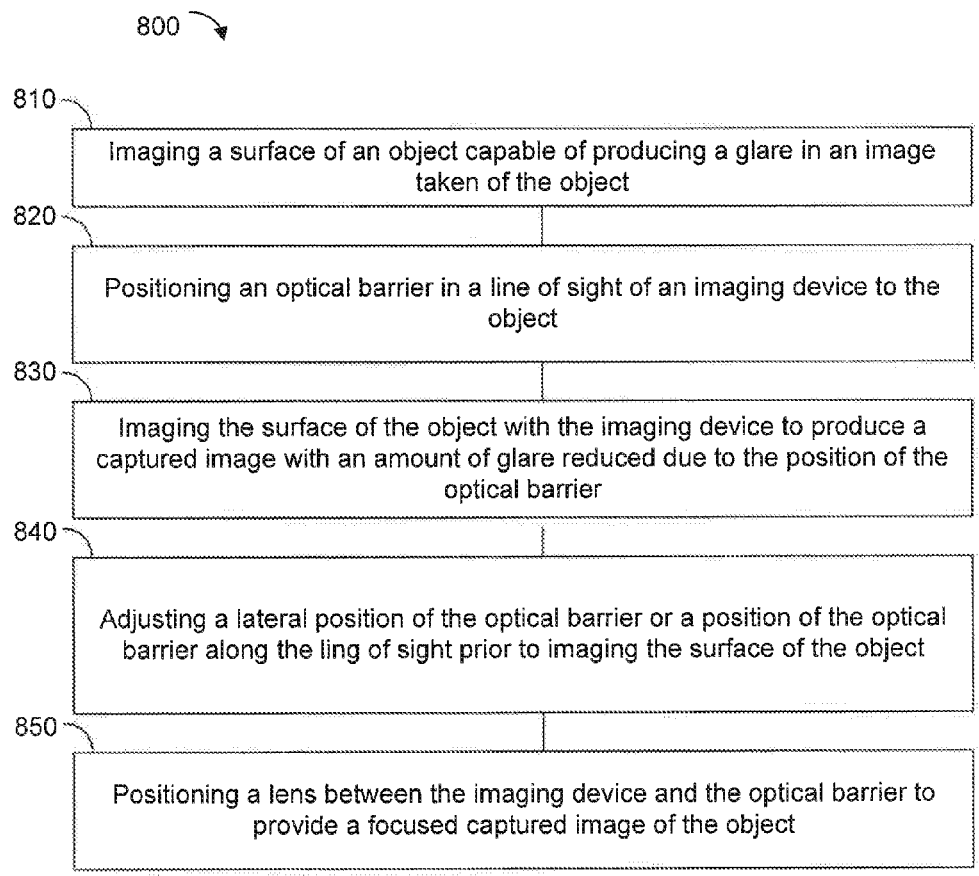
FIG. 8 depicts a flowchart of an embodiment of a method.

FIG. 8 illustrates a flowchart depicting an embodiment of a method. The method 800 comprises imaging a surface of an object capable of producing a glare in an image taken of the object, at 810. The method 800 also comprises positioning an optical barrier a line of sight of an imaging device to the object, at 820. The method 800 also comprises imaging the surface of the object with the imaging device to produce a captured image with an amount of glare reduced due to a position of the optical barrier, at 830.

The method 800 may further comprise adjusting a lateral position of the optical barrier or a position of the optical barrier along the line of sight prior to imaging the surface of the object with the optical barrier in position, at 840. The method may further comprise positioning a lens between the imaging device and the optical barrier to provide a focused captured image of the object, at 850.

Figure 9:
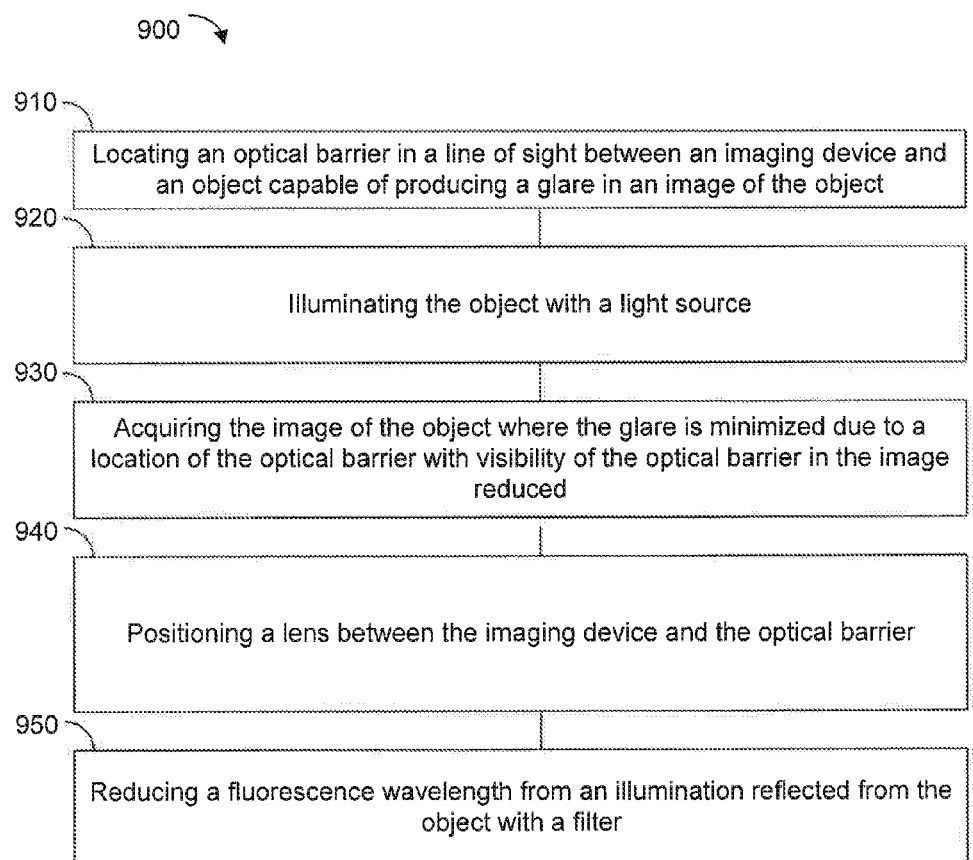
FIG. 9 depicts a flowchart of another embodiment of a method.

FIG. 9 illustrates a flowchart depicting an embodiment of another method. The method 900 comprises locating an optical barrier in a line of sight between an imaging device and an object capable of producing a glare in an image of the object, at 910. The method also comprises illuminating the object with a light source, at 920. The method also comprises acquiring the image of the object where the glare is minimized due to a location of the optical barrier with visibility of the optical barrier in the image reduced, at 930.

The method 900 may also comprise positioning a lens between the imaging device and the optical barrier, at 940.

The method 90 may also comprise reducing a fluorescence wavelength from an illumination reflected from the object with a filter, at 950.

Though the steps illustrated in the flowchart of the methods and provided in a particular sequence, this sequence is not meant to be limiting as those skilled in the art will recognize that these steps may be performed in any particular order.

While various disclosed embodiments have been described above, it should be understood that they have been presented by way of example only, and not limitation. Numerous changes to the subject matter disclosed herein can be made in accordance with the embodiments disclosed herein without departing from the spirit or scope of the embodiments. In addition, while a particular feature may have been disclosed with respect to only one of several implementations, such feature may be combined with one or more other features of the other implementations as may be desired and advantageous for any given or particular application.

Therefore, the breadth and scope of the subject matter provided herein should not be limited by any of the above explicitly described embodiments. Rather, the scope of the embodiments should be defined in accordance with the following claims and their equivalents.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Thus, while embodiments have been described with reference to various embodiments, it will be understood by those skilled in the art that various changes, omissions and/or additions may be made and equivalents may be substituted for elements thereof without departing from the spirit and scope of the embodiments. In addition, many modifications may be made to adapt a particular situation or material to the teachings of the embodiments without departing from the scope thereof. Therefore, it is intended that the embodiments not be limited to the particular embodiment disclosed as the best mode contemplated, but that all embodiments falling within the scope of the appended claims are considered.

What is claimed is:

1. A system comprising:
   an imaging device with a line of sight to a curved object having a curved surface with a fingerprint thereon, which is to be captured in an image of the curved object;
   a light source configured to illuminate the curved surface of the curved object, the light source to produce light being reflected off of the curved surface, the reflected light including glare reflected along the line of sight; and
   a passive, non-transmissive optical barrier positioned in the line of sight from the imaging device to the curved object, said passive, non-transmissive optical barrier being spaced apart from the imaging device along the line of the sight and said passive, non-transmissive optical barrier being sized and positioned to reduce the reflected light off the curved surface of the curved object directed along the line of sight from being captured in the image by the imaging device, wherein the passive, non-transmissive optical harrier comprises a curved configuration.

2. The system according to claim 1, further comprising a lens positioned between the imaging device and the passive, non-transmissive optical barrier.

3. The system according to claim 1, further comprising a filter positioned between the imaging device and the passive, non-transmissive optical barrier, said filter configured to reduce a fluorescence wavelength from the light reflected off the curved surface of the curved object.

4. The system according to claim 1, wherein the passive, non-transmissive optical barrier is positioned to block a first portion of the reflected light directed along a direct line of sight between the imaging device and a portion of the curved object, and wherein the passive, non-transmissive optical barrier is positioned outside a path of a second portion of the reflected light directed away from the direct line of sight from the portion of the curved object to the imaging device.

5. The system according to claim 4, further comprising a lens configured to direct the second portion of reflected light from the portion of the curved object away from the line of sight and towards the imaging device.

6. The system according to claim 1, wherein the light source is configured to be located off of the line of sight of the imaging device to the curved object.

7. The system according to claim 1, wherein the curved configuration of the passive, non-transmissive optical barrier comprises a same curve as a curve of the curved object wherein the curved object comprises a cylindrical shape or spherical shape.

8. The system according to claim 1, wherein the passive, non-transmissive optical barrier is separated from the curved object by a first distance along the line of sight, wherein the passive, non-transmissive optical barrier is separated from the imaging device by a second distance along the line of sight, wherein the first distance is less than the second distance.

9. The system according to claim 1, wherein the passive, non-transmissive optical barrier is invisible in the image of the curved object with the fingerprint captured with the imaging device.

10. A method comprising:
    imaging, by an imaging device, a curved surface of a curved object having a fingerprint thereon which produces reflected glare in a captured image taken of the curved object and the fingerprint;
    positioning a passive, non-transmissive optical barrier along a line of sight from the imaging device to the curved object such that the passive, non-transmissive optical barrier is spaced apart from the imaging device along the line of sight, wherein the passive, non-transmissive optical barrier is a non-powered barrier with non-transmissive properties; and
    during imaging of the curved surface of the curved object with the imaging device, the captured image being imaged with an amount of the reflected glare reduced due to a position of the passive, non-transmissive optical barrier wherein the passive, non-transmissive optical barrier comprises a curved configuration.

11. The method according to claim 10, further comprising adjusting a lateral position of the passive, non-transmissive optical barrier or a position of the passive, non-transmissive optical barrier along the line of sight prior to imaging the curved surface of the curved object with the passive, non-transmissive optical barrier in position.

12. The method according to claim 10, further comprising positioning a lens between the imaging device and the passive, non-transmissive optical barrier to provide a focused captured image of the curved object.

13. The method according to claim 10, wherein the passive, non-transmissive optical barrier is invisible in the captured image of the curved object with the fingerprint captured with the imaging device.

14. A method comprising:
locating a passive, non-transmissive optical barrier in a line of sight between an imaging device and a curved object, the passive, non-transmissive optical barrier is a non-powered barrier with non-transmissive properties;
illuminating the curved object with a light source, the curved object producing and reflecting glare along the line of sight during the illuminating; and
acquiring, by the imaging device, an image of the curved object wherein the reflected glare is minimized due to a location of the passive, non-transmissive optical barrier with visibility of the passive, non-transmissive optical barrier in the image reduced and wherein the passive, non-transmissive optical barrier comprises a curved configuration comprising a same curve as a curve of the curved object.

15. The method according to claim 14, further comprising positioning a lens between the imaging device and the passive, non-transmissive optical barrier.

16. The method according to claim 14, further comprising reducing a fluorescence wavelength from an illumination reflected from the curved object with a filter.

17. The method according to claim 14, wherein the illuminating the curved object with the light source further comprises illuminating the curved object from off of the line of sight of the imaging device to the curved object.

18. The method according to claim 14, wherein the locating the passive, non-transmissive optical barrier further comprises spacing the passive, non-transmissive optical barrier from the curved object by a first distance along the line of sight and spacing the passive, non-transmissive optical barrier from the imaging device by a second distance along the line of sight, wherein the first distance is less than the second distance.

19. The method according to claim 14, wherein the passive, non-transmissive optical barrier is invisible in the image of the curved object captured with the imaging device.

* * * * *

UNITED STATES PATENT AND TRADEMARK OFFICE
CERTIFICATE OF CORRECTION

| | |
|---|---|
| PATENT NO. | : 9,329,313 B2 |
| APPLICATION NO. | : 14/022198 |
| DATED | : May 3, 2016 |
| INVENTOR(S) | : Edward Jozef Miesak |

It is certified that error appears in the above-identified patent and that said Letters Patent is hereby corrected as shown below:

In the claims,

Column 6, claim 1, line 10, delete "harrier" and insert --barrier--.

Signed and Sealed this
Twelfth Day of July, 2016

Michelle K. Lee
*Director of the United States Patent and Trademark Office*